United States Patent
Moeller (10) Patent No.: US 7,172,524 B2
(45) Date of Patent: Feb. 6, 2007

(54) AUTOMOTIVE VEHICLE TRANSMISSION SYSTEMS

(75) Inventor: Frank Moeller, Stafford (GB)

(73) Assignee: Drivetec (UK) Limited, London (GB)

( * ) Notice: Subject to any disclaimer, the term of this patent is extended or adjusted under 35 U.S.C. 154(b) by 0 days.

(21) Appl. No.: 10/497,699

(22) PCT Filed: Dec. 4, 2002

(86) PCT No.: PCT/GB02/05429

§ 371 (c)(1),
(2), (4) Date: Jan. 21, 2005

(87) PCT Pub. No.: WO03/047897

PCT Pub. Date: Jun. 12, 2003

(65) Prior Publication Data

US 2005/0124449 A1    Jun. 9, 2005

(30) Foreign Application Priority Data

Dec. 5, 2001    (GB)    ................ 0129125.1

(51) Int. Cl.
*F16H 3/72* (2006.01)
(52) U.S. Cl. ............ 475/5; 477/3; 180/65.6; 701/22
(58) Field of Classification Search ........ 475/5; 477/3; 180/65.6; 701/22
See application file for complete search history.

(56) References Cited

U.S. PATENT DOCUMENTS

| | | | |
|---|---|---|---|
| 3,793,910 A | | 2/1974 | Nasvytis |
| 4,481,842 A * | 11/1984 | Nelson | .................. 476/61 |
| 4,782,823 A * | 11/1988 | Yamasaki | ................ 601/127 |
| 4,836,049 A * | 6/1989 | Moan | .................... 475/52 |
| 5,309,778 A * | 5/1994 | Antonov | ................. 74/15.86 |
| 5,558,589 A | | 9/1996 | Schmidt |
| 5,558,595 A | | 9/1996 | Schmidt et al. |
| 5,577,973 A | | 11/1996 | Schmidt |
| 5,603,671 A | | 2/1997 | Schmidt |
| 5,730,676 A | | 3/1998 | Schmidt |
| 5,904,631 A | | 5/1999 | Morisawa et al. |
| 5,931,757 A | | 8/1999 | Schmidt |
| 5,951,424 A * | 9/1999 | Briceland | .................. 475/72 |
| 6,358,173 B1 | | 3/2002 | Klemen et al. |
| 6,371,878 B1 | | 4/2002 | Bowen |

(Continued)

FOREIGN PATENT DOCUMENTS

DE    30 15 754 A1    10/1981

(Continued)

OTHER PUBLICATIONS

Bedingfield, D.L., "Power-Dividing Transmissions" *Machine Design* pp. 83-85 (1957).

(Continued)

*Primary Examiner*—Charles A. Marmor
*Assistant Examiner*—David D. Le
(74) *Attorney, Agent, or Firm*—Finnegan, Henderson, Farabow, Garrett & Dunner, L.L.P.

(57) ABSTRACT

An automotive vehicle transmission system has two epicyclic gearsets and a first and second electrically connected motor/generator. Components of the epicyclic gearsets and the motor/generators are connected such that, when the transmission system is in use, electrical power is transferred between the first and second motor/generators.

6 Claims, 4 Drawing Sheets

U.S. PATENT DOCUMENTS 6,491,599 B1    12/2002    Schmidt
6,546,319 B2    4/2003    Yamaguchi et al.
6,749,532 B2 *    6/2004    Wachauer .................... 475/5

FOREIGN PATENT DOCUMENTS

EP    1247679 A2    10/2002
GB    2363173 A    12/2001
WO    WO 01/94142 A1    12/2001
WO    WO 03/047897 A1    6/2003

OTHER PUBLICATIONS

International Search Report, for Great Britain Application No. GB 0013727.3, mailed Sep. 21, 2001.
International Search Report, for Great Britain Application No. GB 012125.1, mailed Jun. 18, 2002.
Office Action, for U.S. Appl. No. 10/297,480, mailed Aug. 26, 2004.

* cited by examiner

AUTOMOTIVE VEHICLE TRANSMISSION SYSTEMS

This application is a national phase application based on PCT/GB02/05429, filed Dec. 4, 2002, the content of which is incorporated herein by reference and claims the priority of British Application No. 0129125.1, filed Dec. 5, 2001.

BACKGROUND

1. Field of the invention

The present invention relates to automotive vehicle transmission systems and is concerned with that type of such system which comprises two or more compounded epicyclic gearsets, two elements of one of which are connected to rotate with respective elements of the other and connected to rotate with one element of each of which is a respective electric motor/generator unit, the electrical stator connections of which are connected together, whereby power is transferred between the two motor/generator units. Such a transmission system is referred to as of power split or torque split type because the power passing through it is transmitted in part mechanically, i.e. through the two mechanical connections, and in part electrically, i.e. through the electrical connections between the two motor/generator units, the ratio of the two components varying with speed and load. Such transmission systems inherently have a continuously or steplessly variable transmission ratio and are therefore highly advantageous because they provide at all times the gear ratio which is the most appropriate to the user's decision relating to the trade off between optimising fuel economy and maximising acceleration of the vehicle.

2. Description of the Related Art

U.S. Pat. No. 5,558,589 discloses a transmission system of this general type which includes an input shaft which is connected to an engine and, via a first clutch, to the annulus of a first planetary gearset. The annulus meshes with a plurality of planet wheels, which are mounted on a common carrier and mesh with a sunwheel. The annulus is connected to rotate with the planet carrier of a second planetary gearset. The carrier of the first gearset is also connected to rotate to the annulus of the second gearset. The carrier of the second gearset carries planet wheels which mesh with the annulus and the sunwheel of the second gearset. The carrier of the first gearset is connected to a drive shaft which is connected to an output shaft through a second clutch. The sunwheel of the second gearset is also connected to the output shaft through a third clutch. A battery is connected via a controller to first and second motor/generators which are connected to rotate with the first and second sunwheels, respectively.

The transmission system disclosed in the prior U.S. patent is of two regime type. In the first regime, the first and third clutches are engaged and the first motor-generator operates as a generator and its output is fed to the second motor/generator which operates as a motor. The vehicle is accelerated from rest to a speed of about 5 mph in the first regime. The vehicle controller then applies the battery power to the second motor/generator and the speed of the first motor/generator progressively falls to zero, at which point the full power of the engine and the battery are accelerating the vehicle. The transmission is then switched into the second regime by disengaging the third clutch and engaging the second clutch. Acceleration then proceeds up to the desired speed.

As mentioned above, this known transmission system is of two mode or two regime type, that is to say the output shaft is connected selectively to the carrier of the first gearset or the sunwheel of the second gearset by respective clutches. This is necessary in order to be able to obtain the full speed range at the output shaft which is generally necessary for all vehicle applications. The input shaft is connected to the annulus of the first gearset by means of a further selectively operable clutch and whilst this clutch is always engaged during forward movement of the vehicle, it has to be disengaged if the vehicle is to move rearwardly because rearward movement is not produced by energy transmitted from the associated vehicle engine to the input shaft but is instead produced by energy transmitted from a battery with which the transmission system must be provided.

The use of two or more regimes and the necessary associated clutches in a transmission system is, however, associated with a number of disadvantages. Thus the number of components and overall complexity is considerably increased by contrast with a single regime system. Although acceleration can be substantially maintained whilst switching from one regime to another, acceleration is interrupted and this results in jerkiness which is undesirable and has proved impossible to eliminate. Debris necessarily produced by the clutches means that the transmission oil has to be changed relatively frequently.

Nearly all automotive transmission systems of this type which have been proposed have necessarily included two or more regimes because the $\emptyset_{max}$ ratio of each regime is relatively low. The $\emptyset_{max}$ ratio is defined as the ratio of the maximum and minimum possible output speeds at any given value of power throughput and $\emptyset_{max}$ is the value of this ratio at the maximum or rated power of the transmission system. The result of this is that two or more regimes have been necessary in order to obtain a sufficiently broad range of output speeds to render the transmission system usable for automotive applications.

A paper entitled "Power-Dividing Transmissions" by D. L. Bedingfield published in "Machine Design", $25^{th}$ Jul. 1957 discloses a power split transmission in which the input is constituted by the annulus of the first epicyclic gearset and the output is constituted by the planet carrier of the second epicyclic gearset. The planet carrier and annulus of the first epicyclic gearset are connected to the annulus and sunwheel, respectively, of the second epicyclic gearset. The rotors of the two motor/generator units are connected to rotate with the sunwheel of the first gearset and the annulus of the second gearset, respectively.

The two mechanical connections between the two gearsets necessarily "cross over" in this transmission system and this results in considerable mechanical complexity. This mechanical complexity is further increased by the fact that the two motor/generators are situated between the two epicyclic gearsets which means that the high torque shafts necessarily pass through one of the motors. Also the output speed is too low for automotive applications and the output torque too high. Furthermore, it is found that the two motor/generator units effectively "work against" one another which means that there are very high levels of recirculating power around the loop constituted by the two gearsets and the two mechanical connections between them. In practice, the magnitude of the power that is recirculated is found to be substantially in excess of the input power and this means that the components of the two gearsets must be substantially heavier and thus more expensive than would otherwise be the case and/or that the service life of the transmission is unacceptably short. In practice the transmission system disclosed by Bedingfield is unacceptable, both commercially and technically.

It is therefore the object of the invention to provide an automotive transmission system of the type referred to above, particularly for road vehicle use, which can provide a sufficiently broad range of output speeds in a single regime, that is to say does not have any clutches and thus does not suffer from the disadvantages referred to above of such clutches, and which does not suffer from the disadvantages suffered by the transmission system disclosed by Bedingfield.

SUMMARY

According to the present invention an automotive vehicle transmission system comprises two epicyclic gearsets, each comprising a sun member and a carrier member carrying at least one planet member which is in driving engagement with the sun member and with an annulus member, the carrier member of the first epicyclic gearset constituting the input to the transmission system and the carrier member of the second gearset constituting the output from the transmission system, two members of the first epicyclic gearset being connected to rotate with a respective member of the second epicyclic gearset, whereby the two carrier members are not connected together, the transmission system also including first and second motors/generators comprising respective first and second stators connected to ground and respective first and second rotors connected to respective members of the epicyclic trains other than those constituting the input and the output, one of the motor/generators being connected to both sun members or to both annulus members, the carrier member of one of the gearsets being connected to that one of the sun member and the annulus member of the other gearset which is not connected to a motor/generator, the electrical connections of the first stator being connected to the electrical connections of the second stator, whereby, in use, electrical power is transferred between the first and second motor/generators, the transmission system being so arranged that, when the full rated power of the transmission system is applied to the input, the power transferred between the first and second motor/generators changes progressively, as the speed of the output increases, from a first maximum at a first finite speed to zero at a second speed to a second maximum at a third speed to zero at a fourth speed and then to a fifth maximum at a fifth speed, the ratio of the second and fourth speeds being greater than 2.5:1.

There is of course a substantial number of different ways in which two epicyclic gearsets may be combined with two elements of one gearset mechanically connected to two elements of the other gearset and the number of permutations is further substantially increased by the fact that there are numerous potential possibilities for the connection of the rotors of the two motor/generator units. The inventor has exhaustively researched the numerous possibilities and concluded that in order to be technically and commercially feasible for automotive applications the maximum output speed of the transmission system should not exceed about 10,000 r.p.m., there should at no time be an excessive torque loading on either of the motor/generators (since they would otherwise have to be of much more rugged construction which would make them unacceptably heavy, large and expensive) and there should be no excessive power recirculation within the transmission (because this would again necessitate a very much heavier construction or result in a substantially reduced service life). This is on the assumption that the epicyclic gearsets have an $R_o$ value of between 2 and 4, and preferably about 3, which results in the sunwheel and planet wheels being of about the same size. $R_o$ is the ratio of the internal diameter of the annulus to the external diameter of the sunwheel and in the case of an epicyclic gearset incorporating gearwheels is the ratio of the number of teeth on the annulus to the number of teeth on the sunwheel. At $R_o$ values outside this range, size constraints make it difficult to fit bearings into the planet wheels or the sunwheel and the associated shaft become too small.

The inventor has further appreciated as a result of his research that in order to fulfil the various requirements referred to above it is necessary firstly that the two carrier members are used as the input and the output. This is because the carriers have in practice a substantially higher torque capacity than the other elements and the input and output torques are generally higher than the torques encountered elsewhere in the transmission system. It is found also that it is necessary for the stator of one of the motor/generators to be connected to both the annulus members or both the sun members, from which it does of course follow that the two members in question must themselves be connected and that this connection will constitute one of the two connections between the two gearsets. Finally, it is necessary for the carrier member of one of the gearsets to be connected to the annulus member or the sun member of the other gearset.

It is found that only four embodiments comply with all of these rules. In one embodiment the carrier member of the first gearset, which is connected to the input, is connected to the annulus member of the second gearset and the two sun members are connected together and to the rotor of one of the motor/generators. The rotor of the other motor/generator is connected to the annulus member of the first gearset. In a second embodiment, the annulus member and the sun member of the first gearset are connected to the annulus member and carrier member of the second gearset, respectively, the rotor of the first motor/generator unit being connected to the two annulus members and the rotor of the second motor/generator unit being connected to the sun member of the second gearset. In a third embodiment, the annulus member and the sun member of the first gearset are connected to the carrier member and sun member of the second gearset, respectively, the rotor of the first motor/generator unit being connected to the annulus member of the second gearset and the rotor of the second motor/generator unit being connected to the sun member of the second gearset. The first embodiment referred to above is particularly suitable for use with diesel engines whilst the second embodiment is particularly useful for use with petrol engines, which typically have a higher engine output speed and thus transmission input speed.

All the elements in all the embodiments may be gearwheels, particularly spur gearwheels, but the second embodiment referred to above is also particularly suited to the use of roller traction drive elements.

In a transmission system of this type, one of the motor/generators acts as a generator and transfers electrical power to the other motor/generator which acts as a motor. A proportion of the power transmitted by the transmission system is thus transmitted mechanically whilst a further varying proportion, which is typically up to about one third of the total, is transmitted electrically. Varying the electrical power transmitted between the two motor/generators, which may simply be achieved by varying the speed by means of a known controller of one of the motor/generators, results in the speed of the output varying at constant speed of the input and thus in the gear or transmission ratio of the transmission system altering.

As discussed above, the electrical power transferred between the two motor/generators varies as the output speed varies and at least usually reaches zero at two different output speeds. When this power is zero, one of the motor/generators is stationary. The first of these speeds is commonly zero, as in the transmission disclosed in U.S. Pat. No. 5,558,589 in which one of the motor generator units is connected to rotate with the output. Thus in the prior patent, when the vehicle is stationary, one of the motor/generators is also stationary and no power is transmitted between the motor/generators. However, in the transmission in accordance with the invention, the power transmitted between the two motor/generators is zero at a first finite output speed, i.e. an output speed greater than zero, and at a second higher output speed, whereby power is transmitted between the motor/generators at zero output speed. This means that the transmission in accordance with the present invention provides a "geared neutral", i.e. the output may be arranged to be stationary when the input is rotating. Tests have revealed that this is an essential feature if an acceptably high $\emptyset_{max}$ ratio for road vehicle use is to be achieved.

As explained above, the ratio (referred to as the Node Span Ratio, or NSR) of the output speeds at full rated power of the transmission system at which the power transferred between the two motor/generators is zero (referred to as nodes or node points) is at least 2.5 and preferably does not exceed 5, though this value can be as high as 10 or even higher. It has been found that this ratio is related to the $\emptyset_{max}$ ratio and that an acceptably high value of $\emptyset_{max}$ can only be achieved if the NSR is greater than 2.5. As may be seen in FIG. 3 of U.S. Pat. No. 5,558,589, the prior transmission system effectively has no NSR in the first regime because the first speed at which the electrical power transferred between the two motor/generators is zero is also zero. In the second regime, the two speeds at which the electrical power transferred is zero (as indicated by a zero speed of one of the motor/generators) are about 28 mph and 61 mph, which results in a NSR of about 2.18. It is this low value of NSR in the second regime of the prior patent that necessitated the provision of the first regime and thus resulted in the prior transmission system being effectively unusable and commercially unacceptable.

The transmission system in accordance with the invention, however, has an NSR greater than 2.5 which results in a $\emptyset_{max}$ ratio which is sufficiently high for the transmission system to be usable at commercially acceptable cost in a single regime. The NSR is influenced by a number of factors, such as the details of the manner in which the two gear trains are connected together, the number and type of teeth on the various gearwheels and the nature of the motor/generators. The latter are preferably of brushless type, more particularly of switched reluctance type. Switched reluctance motors can rotate at very high speed, which may be necessary if the second node point is to be reached at all.

In practice, zero output speed or the "geared neutral" cannot be achieved at full power but is only achievable at substantially reduced input power values. As the input power is reduced, the NSR remains in practice approximately constant but the $\emptyset$ ratio increases substantially and it is found that a relatively modest increase in the value of $\emptyset_{max}$ results in a very much greater increase in the value of $\emptyset$ at lower power levels and it is this phenomenon which results in the transmission in accordance with the invention being acceptable for road vehicle use in single regime form.

As the output speed of the transmission system in accordance with the invention increases under the application of full rated power, the electrical power transmitted between the two motor/generators passes sequentially through zero twice and three maxima. The motor/generators must of course be sized and rated to cope with the maximum possible current loads and if, for instance, one of the maxima were at a significantly higher numerical value than the other two, this would result in the motor/generators being rated at a higher value than is consistent with the two other maxima and thus in their being larger, heavier and thus more expensive than is strictly necessary. There is a tendency for the electrical power transferred between the motor/generators at the first and fifth speeds to be greater than at the third speed and in order to avoid the inefficiency that this would entail it is preferred that the transmission system is so arranged that the power transferred between the motor/generators at the first and fifth speeds is no greater than at the third speed.

BRIEF DESCRIPTION OF THE DRAWINGS

Further features and details of the invention will be apparent from the following description of certain specific embodiments which is given by way of example only with reference to the accompanying drawings, in which.

DETAILED DESCRIPTION OF THE PREFERRED EMBODIMENTS

Figure 1:
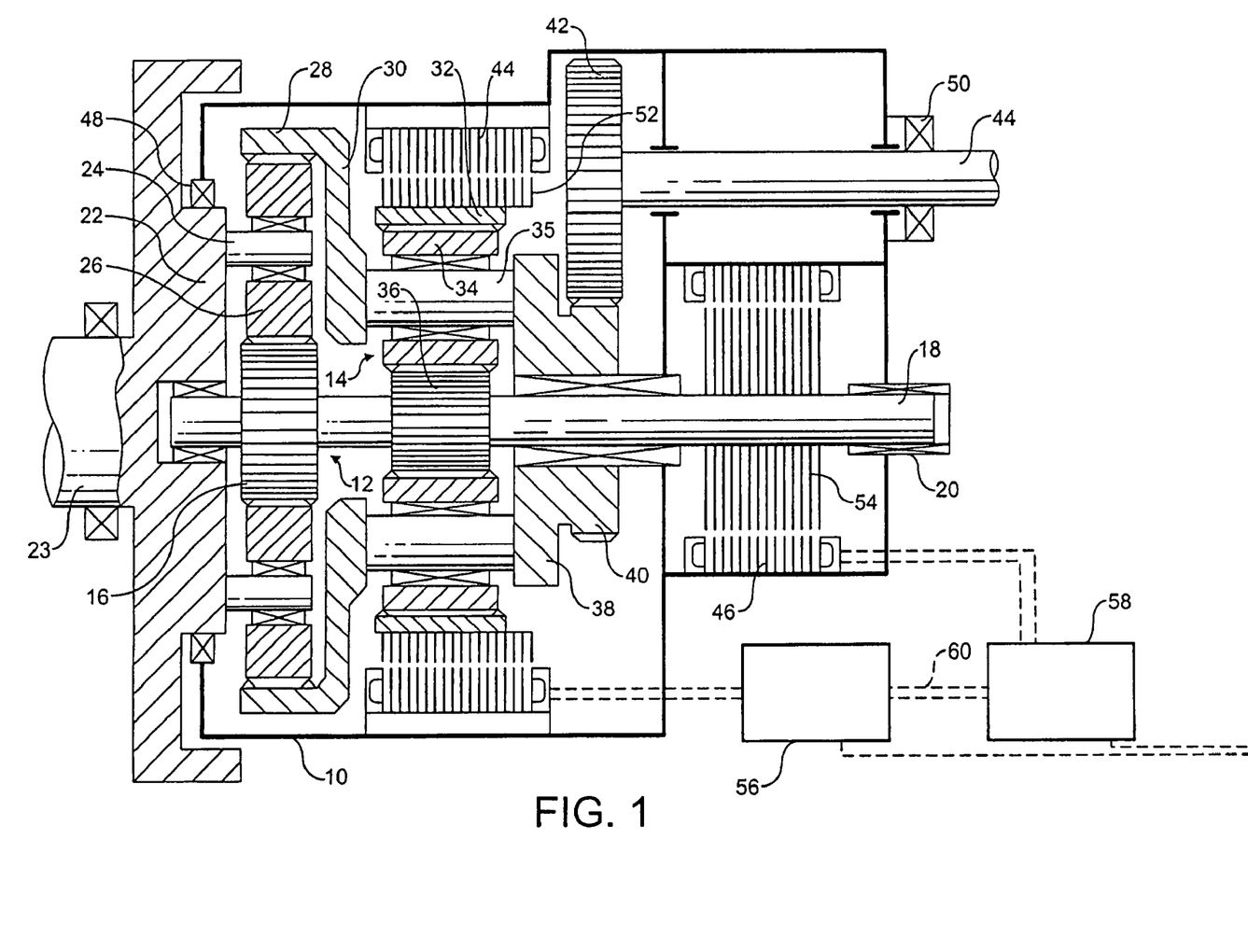
FIG. 1 is a diagrammatic view of a first embodiment of automotive transmission system in accordance with the invention for use in a rear wheel drive car.

The transmission shown in FIG. 1 comprises an outer housing 10 accommodating two epicyclic gearsets 12 and 14. The first gearset 12 comprises a first sunwheel 16, which is fixedly carried by a shaft 18 which is mounted to rotate with respect to the housing 10 by bearings 20. A first carrier 22, which constitutes a flywheel and is connected to an input shaft 23 to the transmission carries a number, in this case three, of equispaced shafts 24, which carry respective first planet wheels 26. The first planet wheels 26 are in mesh with the first sunwheel 16 and with an internally toothed first annulus 28.

The first annulus 28 is connected via a radial flange 30 to shafts 35, of which there are three, which carry respective second planet wheels 34 and are connected to a second carrier 38. The planet wheels 34 are in mesh with internal toothing on the second annulus 32 and in mesh with a second sunwheel 36 fixedly carried by the shaft 18. The second carrier 38 includes an externally toothed portion 40 which is in mesh with a gearwheel 42 connected to the output shaft 44.

The transmission system includes first and second motor/generators of brushless and, in this case, switched reluctance type. The motor/generators include respective first and second stators 44 and 46 which are stationarily fixed to the housing 10. The first stator 44 is sealed with respect to the flywheel 22 by means of an oil seal 48 and a similar oil seal 50 is provided between the output shaft and the outer housing. The first motor/generator also includes a first rotor 52, which is connected to rotate with the second annulus 32, and the second motor/generator includes a second rotor 54, which is connected to rotate with the shaft 18 and thus with the two sunwheels 16, 36.

The stator connections on the two stators 44, 46 are connected via respective controllers 56, 58 of known type to a common busbar 60. The controllers will be connected, in use, to e.g. the engine management system of the vehicle in which the transmission is installed. They are used in known manner to control the speed of one or both motor/generators and the voltage applied to the busbar 60 by that motor/generator which is acting as a generator and thus to control the electrical power that is transferred between the two motor/generators. This control is of course how the output speed and thus the transmission ratio of the transmission system are varied in response to commands by the user, e.g. by the application of pressure to the brake or accelerator pedals.

Figure 2:
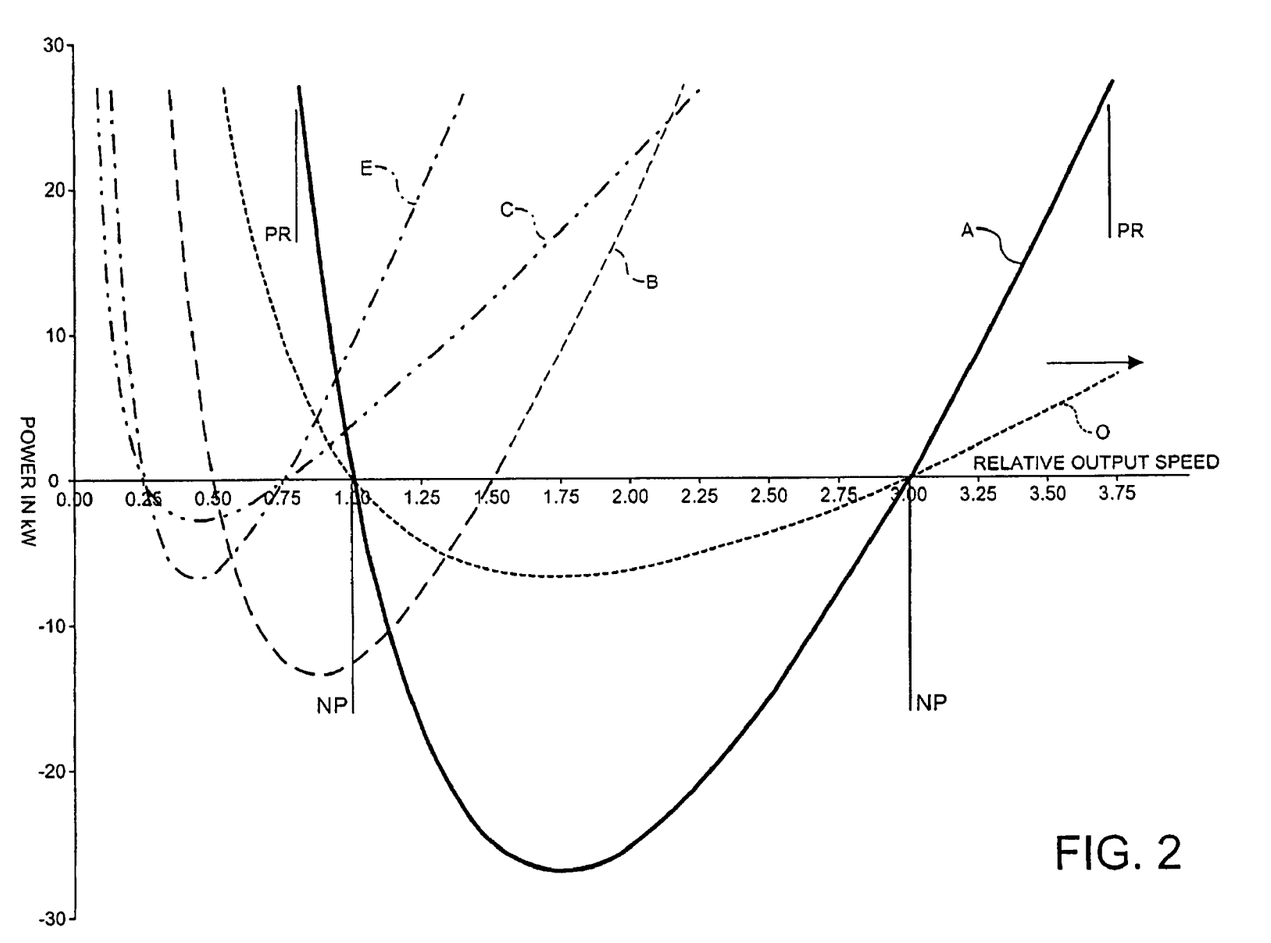
FIG. 2 is a graph showing the power (in kW) transferred between the two motor/generators shown in FIG. 1 against the output speed (shown dimensionlessly as a ratio)

FIG. 2 is a graphical representation of the power transferred between the motor/generators at different relative output speeds and at different input powers. The solid line curve marked A shows the electrical power flow at maximum or rated input power, which in this case is 100 kW. The various further curves marked B to E show the electrical power flow at half power, quarter power, quarter power full speed and quarter power one tenth speed, respectively. As may be seen, when the rated power is applied, the output speed cannot be zero and has in fact a minimum at a relative value of about 0.76, at which the power transferred between the motor/generator is at a first maximum of about 27 kW. As the output speed increases, the electrical power transferred decreases until at a relative speed of about 1 a first node point is reached at which the power transferred is zero. As the output speed continues to increase the electrical power transferred progressively increases again but in the opposite direction, indicating that the two motor/generators, which were previously acting as a motor and a generator are now acting as a generator and a motor respectively. As the output speed continues to increase, the power transferred reaches a second maximum, again of about 27 kW, at a relative speed of about 1.7 and then decreases to zero again at a further node point at a relative speed of 3. The power flow again reverses direction and rises to a further maximum of about 27 kW at a relative speed of about 3.75. The remainder of the input power is of course transmitted mechanically through the gearwheels and not electrically.

It may thus be seen that at maximum power the Node Span Ratio, which is the ratio of the speeds at the two node points, i.e. the ratio of the speeds at the two points marked NP, is 3. The value of $\emptyset_{max}$ is the ratio of the output speeds at the two points marked PR, namely 4.64 in this case. As the power and speed decrease, the value of $\emptyset$ rises dramatically and under the operational conditions shown by curves B, C, D and E are 6.4, 10.5, 10.5 and 27.2, respectively. It will however be seen that the Node Span Ratio remains substantially constant at about 3.

The power that is transmitted through the transmission mechanically, i.e. through the meshing sets of gear teeth, is transmitted with a high efficiency of typically 97%. However, that proportion of the power that is transmitted electrically, i.e. via the motor/generators, i.e. transmitted with a lower efficiency of e.g. 85%. It is therefore clearly desirable to minimise the proportion of the power that is transmitted electrically and this may be achieved by programming the engine management system to maintain operation of the transmission in the vicinity of one or other of the node points, whereby the power transmitted between the motor/generators and thus the resistive losses will be maintained relatively low.

Figure 3:
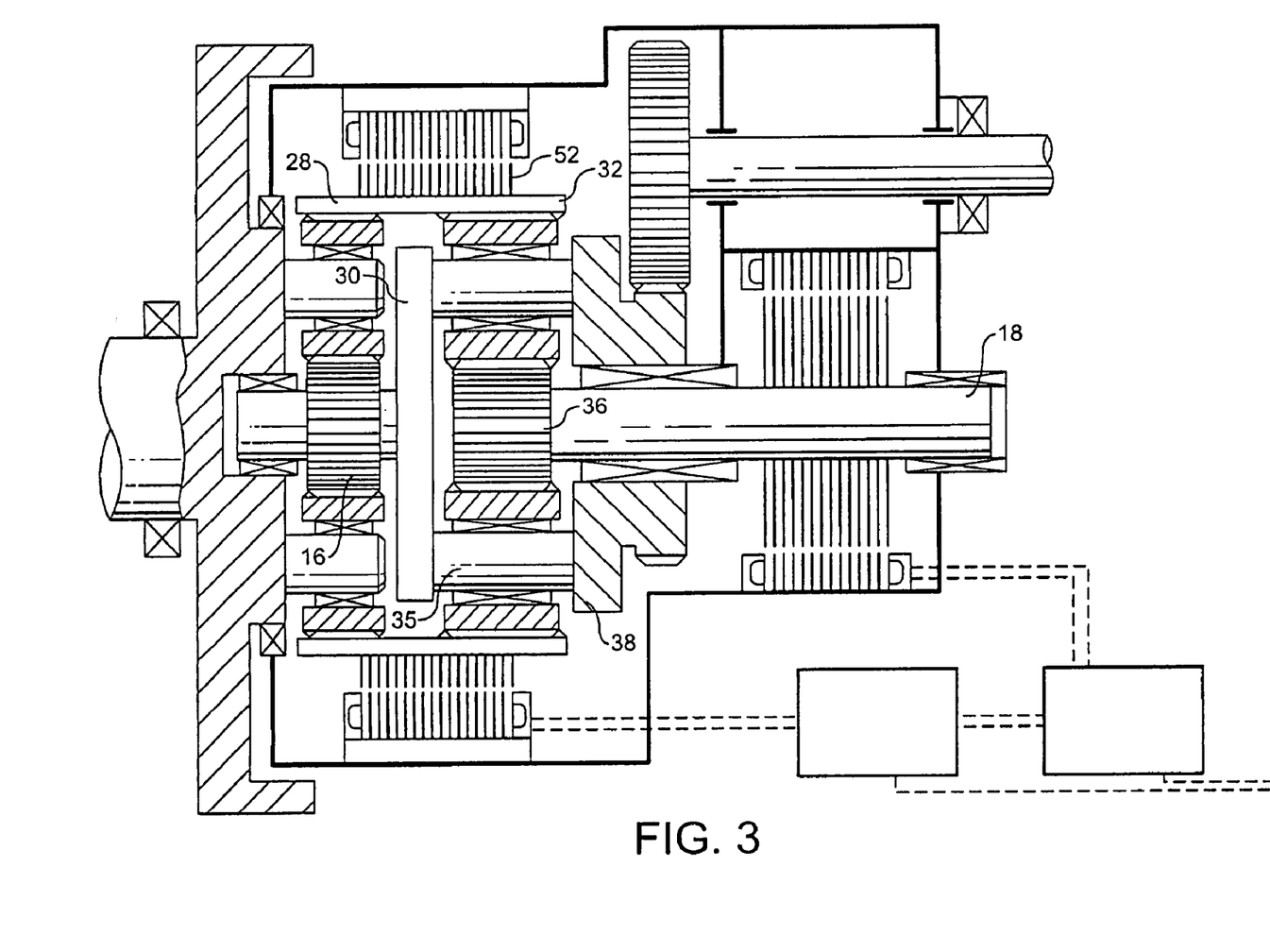
FIGS. 3 and 4 are views similar to FIG. 1 of second and third embodiments of transmission system in accordance with the invention.

The second embodiment illustrated in FIG. 3 is similar to that illustrated in FIG. 1 and only the differences will therefore be described. The two sunwheels 16 and 36 are no longer connected together but may rotate independently. The two annulus members 28 and 32 are now connected together and to the rotor 52 of the first motor/generator. The radial flange 30 now connects the sunwheel 16 of the first epicyclic gearset to the shafts 35 of the carrier 38 of the second epicyclic gearset. The operation and advantages of the second embodiment are essentially the same as those of the first embodiment.

Figure 4:
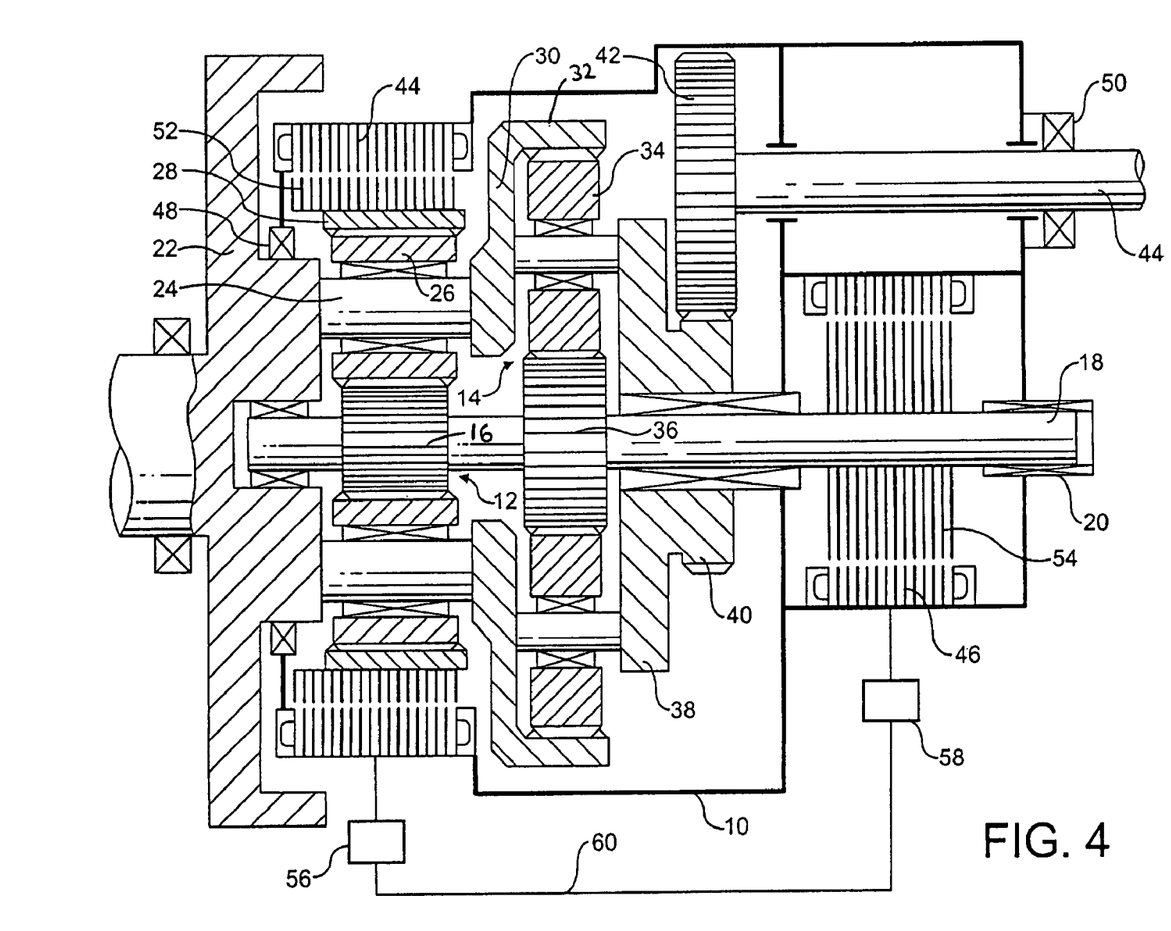

The third embodiment illustrated in FIG. 4 is again very similar to that illustrated in FIG. 1. The only two differences are firstly that the rotor 52 of the first motor/generator is connected to the annulus 28 of the first and not the second epicyclic gearset and secondly that the radial flange 30 connects the carrier 22 of the first gearset to the annulus 32 of the second gearset. In all other respects the construction is the same as that of FIG. 1 and the operation and advantages are again substantially the same.

In all the embodiments described above, appropriate variation of the input mechanical power and of the electrical power transferred between the two motor/generators will result in a wide variation in output speed and torque, and also in reverse rotation of the output shaft, when required, appropriate to the operational requirements of an automotive vehicle, e.g. a passenger carrying road vehicle. All the embodiments have a "geared neutral" and can reach standstill and start from standstill without any electrical power input from e.g. a battery.

The two motor/generators in all the above embodiments are "self feeding", that is to say all the electrical power supplied to that unit which is acting as a motor is generated by that unit which is acting as a generator. This is in contrast to the construction disclosed in U.S. Pat. No. 5,558,589 which will only operate with additional electrical input from a battery. However, the transmission system in accordance with the invention can also include a battery connected to the bus bar via a voltage controller. The battery may thus absorb electrical power at those times, when the engine is providing excess power and release it again at those times when power in excess of that being produced by the engine is desirable.

The invention claimed is:

1. An automotive vehicle transmission system rated to receive a maximum "full" power applied to an input, the transmission system comprising:

two epicyclic gearsets, each comprising a sun member and a carrier member carrying at least one planet member which is in driving engagement with the sun member and with an annular member, the carrier member of the first epicyclic gearset constituting the input to the transmission system and the carrier member of the second gearset constituting an output from the transmission system, two members of the first epicyclic gearset being directly connected to rotate with a respective member of the second epicyclic gearset, whereby the two carrier members are not directly connected together, and wherein the ratio of the internal diameter of the annular member to the external diameter of the sun member is between 2 and 4 for each of the two gearsets, and first and second motor/generators comprising respective first and second stators connected to ground and respective first and second rotors connected to respective members of the two epicyclic gearsets other than those constituting the input and the output, one of the first and second motor/generators being connected to rotate both sun members together or to rotate both annulus members together, the carrier member of one of the gearsets being connected to that one of the sun member and the annulus member of the other gearset which is not connected to the first or second motor/generator, electrical connections of the first stator being connected to electrical connections of the second stator, whereby, in use, electrical power is transferred between the first and second motor/generators, the transmission system being so arranged that, when the full-rated power of the transmission system is applied to the input, the power transferred between the first and second motor/generators changes progressively, as the speed of the output increases, from a first maximum at a first finite speed to zero at a second speed to a second maximum at a third speed to zero at a fourth speed and then to a third maximum at a fifth speed, the ratio of the fourth speed to the second speed being greater than 2.5:1.

2. The transmission system as claimed in claim 1 wherein the carrier member of the first gearset is not connected to the annulus member of the second gearset.

3. The transmission system as claimed in claim 1 in which the annulus member and the sun member of the first gearset are connected to the carrier member and sun member of the second gearset, respectively, the rotor of the first motor/generator unit being connected to the annulus member of the second gearset and the rotor of the second motor/generator unit being connected to the sun member of the second gearset.

4. The transmission system as claimed in claim 1 wherein the annulus member and the sun member of the first gearset are connected to the annulus member and carrier member of the second gearset, respectively, the rotor of the first motor/generator unit being connected to the two annulus members and the rotor of the second motor/generator unit being connected to the sun member of the second gearset.

5. The transmission system as claimed in claim 4 wherein all the annulus members, sun members and planet members are spur gears.

6. The transmission system as claimed in claim 4 wherein all the annulus members, sun members and planet members are roller traction drive elements.

* * * * *